United States Patent Office 2,866,768
Patented Dec. 30, 1958

2,866,768

EPOXY MOLDING COMPOSITION AND METHOD OF MOLDING WITH SAME

Luther L. Bolstad, St. Louis Park, Minn., assignor to Minneapolis-Honeywell Regulator Company, Minneapolis, Minn., a corporation of Delaware No Drawing. Application March 18, 1955
Serial No. 495,341

20 Claims. (Cl. 260—37)

This invention relates to resin-containing molding compositions including epoxy ether condensation polymers having the following structure

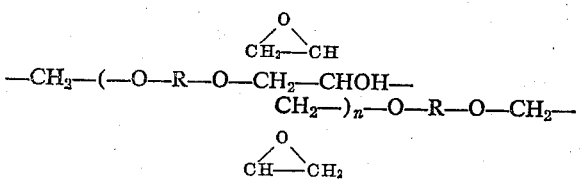

wherein $n$ stands for a number (such as 1, 2, 3 etc.) and R stands for the divalent hydrocarbon radical of a dihydric phenol [such as mononuclear phenols like catechol, resorcinol and hydroquinone or polynuclear phenols like bis-(4-hydroxyphenyl)-2,2-propane ("bis-phenol"), 4,4'-dihydroxy benzophenone, bis-(4-hydroxyphenyl)-1,1-ethane, bis-(4-hydroxyphenyl)-1, 1-isobutane, bis-(4-hydroxyphenyl)-2,2 butane, bis-(4-hydroxy-2,2-methylphenyl)-2,2-propane, bis-(4-hydroxy-2-tertiary butyl phenyl)-2,2-propane, bis-(2-dihydroxy-naphthyl)-methane, 1,5-dihydroxynaphthalene, and the like]. Such epoxy ethers are described in the patents to Bradley No. 2,500,600 and to Newey No. 2,553,718, and reference is made to these patents for descriptions of these resins and methods of preparing the same. Epoxy ether resins made by condensing epichlorhydrin and bis-(4-hydroxyphenyl)-2,2-propane ("bis-phenol") are available commercially.

The present invention is an improvement over the copending application of Jerome L. Formo et al., Serial No. 306,306, filed August 25, 1952, entitled "Resin Composition" and assigned to the same assignee as the present invention.

An important object of the present invention is to provide a rapidly curing molding composition curable by heat, including an epoxy ether resin which composition will not set up or cure over relatively long periods of time at room temperature (in other words, will be characterized by a long "shelf life"); which will not adhere, when set or cured, to the surface of the mold (whether made of metal or other material) within which the molding operation is carried out; and which, when set or cured, will be characterized by extremely high electrical insulation resistance, high impact resistance and low moisture absorption.

A specific object of this invention is to provide a molding composition of the nature indicated which when cured or set is characterized by distinct heat conductive properties.

Another specific object of the invention is to provide a molding composition of the nature indicated modified so as to render the set or cured material electrically conductive, the electrical conductivity being uniform throughout the cured or set material.

A further object of the present invention is to provide a heat curable epoxy resin molding composition which is characterized by having an unusually rapid curing cycle, in the range of a minute or less.

Other and further objects and features of the present invention will become apparent from the following description and appended claims.

The improved molding compositions of this invention comprise an epoxy resin of the type described, a diamine curing agent and a phenol-type accelerator. The mixture may include, for example, up to 30 parts of a diamine curing agent per 100 parts of resin and up to about 10 parts of accelerator per 100 parts of resin-diamine compound. The epoxy resins employed in the invention are characterized by having the number designated in the above-noted structural formula as '$n$' falling within the range of from more than 0 up to about 20. It should be noted, in this connection, that the epoxide resins in question are mixtures of compounds each having the indicated structure, and that the number herein designated as "$n$" is the average of the integral numbers "$n$" which characterize each compound making up these mixtures.

If desired, the epoxy resin content of the molding composition may be distributed between several epoxy resins having "$n$" numbers of different values, as long as the average of these numbers falls within the above disclosed range, due allowance being made for the proportion of the several epoxy resins.

The epoxy resin content of the molding compositions may range from 5 to 60% (by weight of the molding compositions) or more, the resin preferably made from epichlorhydrin and "bis-phenol." The diamine is present in an amount ranging from about ½% to 30% by weight of the epoxide resin, however the range of from 3 to 20% is generally preferred. The ratio of epoxide resin to diamino diphenylmethane is preferably regulated according to the magnitude of the number "$n$" characterizing the epoxide resin, as tabulated:

| "$n$" | Percent Amine |
|---|---|
| 0 | 25±5 |
| 2.5 | 10±2 |
| 12 | 6.25±2 |
| 20 | 1.5±1 |

At values of "$n$" falling between the tabulated values, the amount of amine is adjusted proportionally.

The accelerator is selected from the class consisting of phenol, catechol, resorcinol, and cresol. These accelerators when added to the composition catalyze the reaction between the epoxy resin and the p,p'-diaminodiphenylmethane, causing the reaction to proceed at a much faster rate as evidenced by the shorter reaction times and curing cycles required. I prefer to add the accelerator in an amount ranging from greater than 0% up to about 10% based on the weight of the resin and the p,p'-diamino-diphenylmethane hardner, with the preferred range being substantially between 4 and 8%. Table I shows the gel times for various epoxy resin-diaminodiphenylmethane - accelerator mixtures. The resin mixture includes 4 parts resin to 1 part diaminodiphenylmethane. The epoxy resin employed is a liquid resin having a value for "$n$" equal to about 1.

TABLE I

| Accelerator | Grams Accelerator Per 10 Grams Resin-diaminophenyl-methane Mixture | Gel Time in minutes at 300° F. |
|---|---|---|
| Phenol | 0 | 4.65 |
|  | 0.1 | 3.4 |
|  | 0.2 | 2.9 |
|  | 0.4 | 2.25 |
|  | 0.6 | 1.5 |
|  | 0.8 | 1.15 |
|  | 1.0 | 0.7 |
| Catechol | 0 | 4.65 |
|  | 0.2 | 1.7 |
|  | 0.4 | 1.0 |
|  | 0.6 | 0.7 |
|  | 0.8 | 0.45 |
|  | 1.0 | 0.35 |
| Resorcinol | 0 | 4.85 |
|  | 0.2 | 2.7 |
|  | 0.4 | 1.9 |
|  | 0.6 | 1.05 |
|  | 0.8 | 0.95 |
| Cresol | 0 | 4.6 |
|  | 0.2 | 3.3 |
|  | 0.4 | 2.45 |
|  | 0.6 | 1.75 |
|  | 0.8 | 1.7 |
|  | 1.0 | 1.5 |
|  | 1.5 | 1.25 |

It is believed that when the above disclosed mixtures of epoxide resins and diaminodiphenylmethane are heat-cured, there takes place a cross linkage through reaction of the active hydrogens of the amines with the epoxide groups. The accelerators appear to catalyze the reaction between the resin and the diaminodiphenylmethane, however, since no free accelerator is available after curing has been accomplished, it is believed that the accelerator is chemically combined into the cured or final product. The physical properties of the resin cured with accelerator appear to be somewhat improved over those of the resin cured without accelerator provided the accelerator is not included in the resin mixture in amounts exceeding about 10%. (See Table II.) The shelf life of these accelerator-containing resins is somewhat shorter than that of similar resins without the accelerator added; however, even with the accelerator, the shelf life is generally in the range of a few months which is sufficiently long to permit normal molding operations and procedures to be followed. The resulting compounds are of novel chemical structure, which explains the unusual properties of the heat-cured materials prepared according to the present invention.

In Table II below there are tabulated the various physical properties for a composition prepared with the accelerator addition and without the addition. The data indicates the superior characteristics obtained when the accelerator is included in the composition. In each case, the composition was prepared as follows:

The molding compositions of the present invention further include conventional fillers or pigments such as glass fibers or granules, asbestos, silica, perlite, biotite or mica, titanium dioxide, chrome yellow, zinc oxide, walnut shell, wood flour, carbon black, acetylene black or resinous material such as nylon fiber. As disclosed hereinbelow, the incorporation of acetylene black or like electrically conducting materials and of titanium dioxide or like heat conducting materials leads to the formation of resinous materials having unique properties.

The amount of fillers or pigments included with our molding compositions may be varied from 20% or less up to as much as 95% depending upon the properties desired in the heat-cured material and upon the specific fillers and/or pigments employed. The particle size distribution of the fillers is often the factor determining the amount to be used for a particular purpose. Good results have been obtained by using various fillers in the percentages (by weight of the molding composition) tabulated as follows:

|  | Percent |
|---|---|
| Wood flour | 40–75 |
| Walnut shell flour | 40–75 |
| Silica flour | 50–90 |
| Nylon fibers | 36–95 |
| Glass fiber | 60–82 |
| Asbestos | 50–75 |
| $TiO_2$ | 20–50 |

It should be understood that the molding compositions may comprise a mixture of several fillers and/or pigments.

The moisture content of the molding compositions should be less than 1% (by weight) and preferably less than 0.5%.

In connection with the preparation of our molding composition, it should be noted that epoxy resins having "$n$" at least equal to 2 are solids. But resins having "$n$" equal to 1 are liquids. When only solid epoxy resins are included, all the ingredients may be mixed in dry form, as by milling on a two roller mill. However, when fibrous fillers are included, I prefer to dissolve the resin in a suitable solvent (such as acetone) and to impregnate the fibrous filler with this solution before the ingredients of the molding composition are milled or otherwise mixed. It is, of course, always possible, even when only solid ingredients are present in the final molding mixture, to dissolve the resin or resins in solvents and to mix the resulting solutions with the remaining (dry) ingredients. Best results are obtained by simply mixing all the ingredients on a two roller mill, the accelerator being added last, the resin being dissolved in a solvent whenever fibrous fillers are employed. When relatively large amounts of resin are employed along with relatively small quantities of accelerator, the accelerator is preferably added dispersed in a solvent such as acetone in order to permit a more homogeneous mixture to be obtained. If it is undesirable to use a solvent in mixing the fibrous fillers with the resin, these fillers may be added gradually to the other ingredients.

Whenever solvents are used in making up these molding compositions, provision is made for removing such solvents, as by milling until the solvents have evaporated or by drying the solvent-containing molding composition subsequent to its preparation, or by using molds having suitable breathing apertures.

The resulting molding compositions are characterized by relatively long shelf life. Samples containing accelerator have been kept for several months and longer periods without becoming unworkable. (Samples of the same composition, however, in the absence of the accelerator have a shelf life of a year or more.) For all practical purposes, my molding compositions may be considered as meeting any and all normal storage requirements that may possibly be encountered.

In spite of their relatively long shelf lives, my molding compositions set or cure rapidly when molded at an elevated temperature. The cure time ranges from several seconds (when the molding composition is preheated) to about 5 minutes (when particularly slow setting epoxy resins are molded without any preheating). The average cure time ranges from less than a minute to about 2 minutes. The curing temperature ranges from 250° to 380° F. and usually falls within the range of from 280° to 350° F. The preferred range is from 300° to 315° F. The molding pressure ranges from 10 to 15 up to about 2000 pounds per square inch, depending on the contents and nature of the filler (if any) of the molding composition, preheating (if any) of the molding composition, molding temperature, and other factors. Generally, enough pressure is used to form the molding composition into a solid or dense product. At a temperature of from 250° to 350° F., the molding pressure will ordinarily range upwardly from 100 pounds per square inch. When extremely rapid curing cycles are used, such as in the range of 30 seconds or less, it may be desirable to post-cure the molded article by baking at about 200° F. to 300° F. for a period ranging from less than an hour up to about a day. This post-cure baking will generally enhance the physical properties of the molded article by increasing its impact strength and raising its heat distortion temperature.

Any conventional molds may be used, such as the well-known compression and transfer molds usually employed for molding resins.

After molding has been completed, the molded articles are easily released from the molds (whether made of metal or other material). In other words, there is no trouble due to adhesion of the molded articles to the mold surfaces. If desired, however, a suitable mold release compound may be utilized either milled integral with the molding composition or coated onto the mold surfaces. I have found that in general, fatty-acid esters are satisfactory in this regard.

The molded articles prepared as disclosed hereinabove are characterized by highly desirable properties. Thus, moisture absorption is less than ¼% and can be reduced to 0.1% or less through the addition of low moisture absorbing fillers. The electrical insulation resistance can be made to exceed $10^6$ megohm-cm. The impact strength exceeds 0.5 ft. lb./in. of notch (Izod) and can be made to exceed 5.0 by the addition of fibrous fillers. When titanium dioxide (in an amount of more than 50% by weight of the molding composition) is used as a filler, the molded articles are characterized by a remarkable heat conductivity coupled with high electrical insulation resistance and high impact strength. When acetylene black (in amounts ranging from 2 to 40% or more by weight of the molding composition) or other electrically conducting materials are used as fillers, the molded products are electrically conducting, and this conductance is uniform throughout the articles. Particularly good results are obtained in the range of from 8 to 10%. Such uniform conductivity has heretofore never been obtained in molded resinous articles.

Specific examples of molding compositions according to the present invention are given hereinbelow. In these specific examples, epoxy resins prepared from epichlorhydrin and "bis-phenol" were used. Epoxy resin No. 1 had "n" equal to 2.0. Epoxy resin No. 2 had an "n" equal to about 0. The diamino-diphenylmethane is indicated in the following table as "D. A. D. P. M."; molding temperature was from 300° to 315° F.; molding pressure, from 150 to 300 pounds per square inch; and molding time, from 3 to 5 minutes:

Example I

A base molding composition having the following constituents was milled together:

Compound: Parts by weight
 Epoxy No. 1 _____ 270
 Epoxy No. 2 _____ 120
 D. A. D. P. M _____ 60
 Silica flour _____ 520
 Nylon fibers _____ 115
 TiO₂ _____ 30
 Fatty acid ester _____ 4.5

Before removing from the mill, 9 parts of catechol were added to this composition and homogeneously mixed therewith. After milling, this material was cured at a temperature of 300° F. and was found to set up in from 2 to 5 minutes. The physical and electrical properties were somewhat superior to those of a similar compound without the catechol accelerator addition.

Example II

To the base molding compound of Example I, 22.5 parts by weight of catechol were added. This material was molded at 300° F. and setup or cured in less than 1 minute and had excellent physical and electrical properties.

Example III

To the base molding composition of Example I, 45.0 parts by weight of catechol were added. This material set up rapidly, being wholely cured in substantially less than 1 minute at 300° F. The properties did not appear to be adversely affected.

Example IV

To the base molding composition of Example I, 22.5 parts by weight of resorcinol were added and milled into the composition. This material was molded at 300° F. and was found to cure in less than 1 minute.

Of course, various fillers such as previously listed herein may be utilized in compositions as listed herein.

In Table II below there is given the comparative values of various physical properties obtained from typical samples of molding compounds including and not including the accelerator of the present invention. Sample #1 was prepared with the base molding compound of Example I including the catechol addition. Sample #2 was prepared from the same base molding compound, however, there was no accelerator added to the mixture. Each sample was post baked at 200° F. for a period of 8 hours.

TABLE II

| Property | Sample #1 | Sample #2 |
|---|---|---|
| Impact (Izod) | 0.44 | 0.44 |
| Water Absorption (in percent) | 0.078 | 0.084 |
| Flexural Strength, p. s. i. | 15,350 | 11,393 |
| Mold Shrinkage (in./in.) | 0.008 | 0.010 |

Similar results to those disclosed in the above specific examples are obtained when proceeding in exactly the same manner except for substituting, in place of resin No. 1, epoxy resins made with "bis-phenol" and having "n" equal, respectively, to 6 and to 12. The same applies to other epoxy resins made with other dihydric phenols.

Many details of composition and procedure may be varied without departing from the principles of this invention. It is, therefore, not my purpose to limit the patent granted on this application otherwise than necessitated by the scope of the appended claims.

I claim:

1. A composition of matter comprising para, para' diamino diphenylmethane together with an epoxy resin having the structural formula

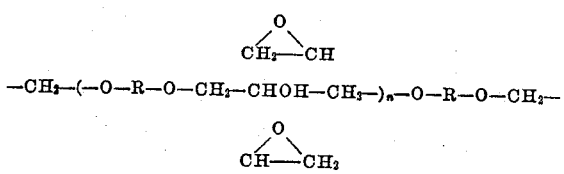

wherein R stands for the hydrocarbon radical of a dihydric phenol and n stands for a number ranging from more than 0 up to about 20, and an accelerator taken from the class consisting of phenol, catechol, resorcinol, and cresol, the said diamino compound being commingled with said epoxy resin in an amount ranging from ½ to 30% by weight of said resin, the said accelerator being included in said composition in an amount ranging from greater than 0% to about 10% based on the weight of said resin and diamino compound.

2. A composition of matter comprising para, para' diamino diphenylmethane together with an epoxy resin having the structural formula:

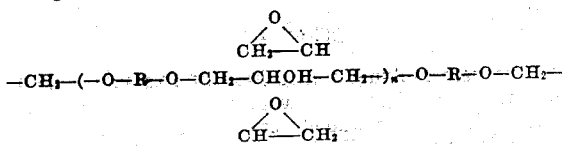

wherein R stands for the hydrocarbon radical of a dihydric phenol and $n$ stands for a number ranging from more than 0 up to about 20, and an accelerator comprising catechol, the said diamino compound included in said composition in an amount ranging from ½ to 30% by weight of said resin, the said accelerator being included in said composition in an amount ranging from greater than 0% to about 10% based on the weight of said resin and diamino compound.

3. A composition according to claim 1 in which the amount of said diamino compound is correlated with the magnitude of the said number represented by "$n$" in said formula according to the following table

| "$n$" | Percent Diamino Compound |
|---|---|
| 0 | 20-30 |
| 2.5 | 8-12 |
| 12 | 4.25-8.25 |
| 20 | .5-2.5 | the amount of said diamino compound being proportionally adjusted for other values of "$n$."

4. A composition according to claim 1 in which R stands for the hydrocarbon radical of bis-(4-hydroxyphenyl)-2,2-propane.

5. A composition according to claim 1 comprising titanium dioxide as a filler.

6. A composition according to claim 1 comprising acetylene black as a filler.

7. A method of making a molded resinous article which comprises providing a composition according to claim 1 and subjecting the said composition to heat in the range of from about 250° F. to about 380° F. and pressure in the range of from about 10 p. s. i. to about 2000 p. s. i.

8. A composition according to claim 3 in which R stands for the hydrocarbon radical of bis-(4-hydroxyphenyl)-2,2-propane.

9. A composition according to claim 3 comprising titanium dioxide as a filler.

10. A composition according to claim 3 comprising acetylene black as a filler.

11. A method according to claim 7 in which said pressure ranges from 10 to 2000 pounds per square inch, said pressure being applied for from 5 seconds to 3 minutes, said pressure being applied at a temperature of from 250° to 380° F.

12. As a novel chemical composition, the cured composition in accordance with claim 1.

13. A composition according to claim 4 comprising titanium dioxide as a filler.

14. A composition according to claim 4 comprising acetylene black as a filler.

15. A composition according to claim 4 comprising a filler in an amount of from 20 to 95% of the total weight of said composition.

16. A composition according to claim 1 comprising two epoxy resins wherein the said "$n$" numbers have dissimilar values.

17. A method of making a molded resinous article characterized by heat conductivity which comprises providing a composition according to claim 5 and subjecting the said composition to heat and pressure.

18. A method of making a molded resinous article characterized by uniform electrical conductivity which comprises providing a composition according to claim 6 and subjecting said composition to heat and pressure.

19. A cured resinous article having a composition in accordance with claim 5.

20. A cured resinous article having a composition in accordance with claim 6.

References Cited in the file of this patent

UNITED STATES PATENTS

| 2,512,997 | Bixler | June 27, 1950 |
| 2,615,007 | Greenlee | Oct. 21, 1952 |
| 2,773,048 | Formo et al. | Dec. 4, 1956 |

FOREIGN PATENTS

| 680,997 | Great Britain | Oct. 15, 1952 |